US012780030B2

(12) United States Patent
Wang et al.

(10) Patent No.: US 12,780,030 B2

(45) Date of Patent: Nov. 3, 2026

(54) ARTIFICIAL INTELLIGENCE BASED SYSTEM AND METHOD FOR ENERGY CELL FAULT IDENTIFICATION

(71) Applicant: GM Global Technology Operations LLC, Detroit, MI (US)

(72) Inventors: Yue-Yun Wang, Troy, MI (US); Ibrahim Haskara, Macomb, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 844 days.

(21) Appl. No.: 18/310,794

(22) Filed: May 2, 2023

(65) Prior Publication Data

US 2024/0367539 A1 Nov. 7, 2024

(51) Int. Cl.

*B60L 58/10* (2019.01)
*B60L 53/62* (2019.01)
*B60W 50/12* (2012.01)

(52) U.S. Cl.

CPC ............... *B60L 53/62* (2019.02); *B60L 58/10* (2019.02); *B60W 50/12* (2013.01)

(58) Field of Classification Search

CPC .................................................. G01R 31/367
USPC ........................................................ 320/109
See application file for complete search history.

(56) References Cited

U.S. PATENT DOCUMENTS

| | | | | |
|---|---|---|---|---|
| 12,228,616 B2 * | 2/2025 | Liu | ...................... | G01R 31/367 |
| 2017/0242077 A1 * | 8/2017 | Guo | ........................ | B60L 58/12 |
| 2023/0307732 A1 * | 9/2023 | Budan | ..................... | B60L 58/12 |
| 2025/0181802 A1 * | 6/2025 | Couture | ............... | G01R 31/367 |

OTHER PUBLICATIONS

Zhang et al.; "Investigation on Internal Short Circuit Indentification of Lithium-Ion Battery Based on Mean-Difference Model and Recursive Least Square Algorithm"; IntechOpen; Electromechanical Devices and Machines; 2019; 16 Pages.

* cited by examiner

*Primary Examiner* — Ahmed H Omar

(74) *Attorney, Agent, or Firm* — CANTOR COLBURN LLP

(57) ABSTRACT

A system for monitoring an electric power storage system includes: a processor electrically connected to multiple sensors, each of the sensors being configured to detect at least one parameter of the electric power storage system the processor being configured to acquire a set of direct measurement data of the set of power cells from the plurality of sensors, provide the set of direct measurement data to a physics model within the processor and generate a set of derived measurement data using the physics model, provide the derived measurement data and at least a portion of the direct measurement data to a machine learning model and generate a coordinate position corresponding to a fault condition of the set of power cells, compare the coordinate position to a fault map and identifying a probable fault cause based on the comparison, and alter an operation of the vehicle based on the comparison.

20 Claims, 4 Drawing Sheets

ARTIFICIAL INTELLIGENCE BASED SYSTEM AND METHOD FOR ENERGY CELL FAULT IDENTIFICATION

INTRODUCTION

The subject disclosure relates to power systems for electric and hybrid electric vehicles, and more specifically to determining a type of fault present within a faulty power cell of an electric power storage system.

Vehicles, including gasoline and diesel powered vehicles, as well as electric and hybrid electric vehicles, feature battery storage for purposes such as powering electric motors, electronics and other vehicle subsystems. Vehicle battery systems may be charged using power sources such as charging stations, other electric vehicle battery systems and/or an electrical grid. During operation, various conditions including wear, age, vehicle damage, and the like can result in degradation of components within the vehicle battery system. Ultimately, such degradation can result in a fault condition within one or more power cell.

SUMMARY

In one exemplary embodiment, a system for monitoring an electric power storage system of a vehicle includes a processor electrically connected to a plurality of sensors, each of the sensors being configured to detect at least one parameter of the electric power storage system the processor being configured to perform, in response to an identified fault condition with a set of power cells and in real time during operation of the vehicle, acquiring a set of direct measurement data of the set of power cells from the plurality of sensors, providing the set of direct measurement data to a physics model within the processor and generating a set of derived measurement data using the physics model, providing the derived measurement data and at least a portion of the direct measurement data to a machine learning model and generating a coordinate position corresponding to a fault condition of the set of power cells, comparing the coordinate position to a fault map and identifying a probable fault cause based on the comparison, and altering an operation of the vehicle based on the comparison.

In addition to one or more of the features described herein, the physics model includes applying one of a recursive least square model, a regression model, and a Kalman filter based model to the set of direct measurement data, and thereby determining an estimated pair of parameters ($a_i$ and $b_i$) for each cell of the electric power storage system.

In addition to one or more of the features described herein, providing the set of direct measurements to a physics model further includes detecting a trenchant current condition of the electric power storage system and providing the set of direct measurements to a first physics model while the electric power storage system is in a non-trenchant current condition and providing the set of direct measurements to a second physics model while the electric power storage system is in a trenchant current condition.

In addition to one or more of the features described herein, the first physics model for each cell is $$\frac{R_{sc}}{R_{sc}+R}V_{oc}+\frac{R_{sc}}{R_{sc}+R}RI_L=aV_{oc}+bI_L,$$

with R being an internal resistance of the cell, $R_{sc}$ being an internal short circuit resistance of the power cell, R being a resistance of the power cell, $V_{oc}$ being an open circuit voltage of the power cell, and $I_l$ being an external load charge current of the power cell.

In addition to one or more of the features described herein, the second physics model is a residual voltage for cell $dV_i=aiV_{ocm}+biI_L$, with constants a and b being estimated using one of a recursive least square regression model and a Kalman filtering model, and $$ai=-\left[1-\frac{R_{sc}}{R_{sc}+R}\frac{V_{oc}}{V_{ocm}}\right],\ bi=\frac{R_{sc}}{R_{sc}+R}R-R_m,$$

for i=1, 2, . . . n cells, with $R_{sc}$ being an internal short circuit resistance of the power cell, R being an internal resistance of the cell, $V_{ocm}$ being a mean voltage and Rm being a mean resistance according to $V_{tm}=V_{ocm}+R_m\ I_L$, and $I_l$ being an external load charge current of the power cell.

In addition to one or more of the features described herein, altering an operation of the vehicle comprises prompting a vehicle operator to cease operation of the vehicle within a predetermined time period in response to the identified probable fault being an internal short circuit of a power cell.

In addition to one or more of the features described herein, the identified probable fault is one of a rising internal resistance, a decreasing internal capacity of the power cell, and an internal short circuit within the cell.

In another exemplary embodiment, a fault within an electric power storage system of a vehicle is identified by detecting a plurality of parameters of an electric power storage system for a vehicle and responding to an identified fault condition with a set of power cells of the electric power storage system of the vehicle by, acquiring a set of direct measurement data of the set of power cells from detected plurality of parameters, providing the set of direct measurement data to a physics model within a processor and generating a set of derived measurement data using the physics model, providing the derived measurement data and at least a portion of the direct measurement data to a machine learning model and generating a coordinate position corresponding to a fault condition of the power cells, comparing the coordinate position to a fault map and identifying a probable fault cause based on the comparison, and altering an operation of a vehicle based on the comparison, and altering an operation of a vehicle based on the comparison.

In addition to one or more of the features described herein, the method is performed in real time during operation of the vehicle.

In addition to one or more of the features described herein, the physics model includes applying one of a recursive least square model, a regression model, and a Kalman filter based model to the set of direct measurement data, and thereby determining pair of estimated parameters ($a_i$, $b_i$) for each cell of the electric power storage system.

In addition to one or more of the features described herein, providing the set of direct measurements to a physics model further includes detecting a trenchant current condition of the electric power storage system and providing the set of direct measurements to a first physics model while the electric power storage system is in a non-trenchant current condition and providing the set of direct measurements to a second physics model while the electric power storage system is in a trenchant current condition.

In addition to one or more of the features described herein, the first physics model for each cell is $$\frac{R_{sc}}{R_{sc}+R}V_{oc}+\frac{R_{sc}}{R_{sc}+R}RI_L=aV_{oc}+bI_L,$$

with R being an internal resistance of the cell, $R_{sc}$ being an internal short circuit resistance of the power cell, R being a resistance of the power cell, $V_{oc}$ being an open circuit voltage of the power cell, and $I_l$ being an external load charge current of the power cell.

In addition to one or more of the features described herein, the second physics model is a residual voltage for cell $dV_i=aiV_{ocm}+biI_L$, with constants a and be being estimated using one of a recursive least square regression model and a Kalman filtering model, and $$ai=-\left[1-\frac{R_{sc}}{R_{sc}+R}\frac{V_{oc}}{V_{ocm}}\right],\ bi=\frac{R_{sc}}{R_{sc}+R}R-R_m,$$

for i=1, 2, . . . n cells, with $R_{sc}$ being an internal short circuit resistance of the power cell, R being an internal resistance of the cell, $V_{ocm}$ being a mean voltage and $R_m$ being a mean resistance according to $V_{tm}=V_{ocm}+R_m\ I_L$, and $I_l$ being an external load charge current of the power cell.

In addition to one or more of the features described herein, altering an operation of the vehicle comprises prompting a vehicle operator to cease operation of the vehicle within a predetermined time period in response to the identified fault being an internal short circuit of a power cell.

In addition to one or more of the features described herein, the identified fault is one of a rising internal resistance, a decreasing internal capacity of the power cell, and an internal short circuit within the cell.

In another exemplary embodiment, a vehicle includes an electric power storage system, at least one vehicle subsystem configured to receive operational power from the electric power storage system, an electric power storage system monitor configured to monitor a health of the electric power storage system. The electric power storage system monitor includes: a processor electrically connected to a plurality of sensors. Each of the sensors are configured to detect at least one parameter of the electric power storage system the processor being configured to perform, in response to an identified fault condition with a set of power cells and in real time during operation of the vehicle, acquiring a set of direct measurement data of the set of power cells from the plurality of sensors, providing the set of direct measurement data to a physics model within the processor and generating a set of derived measurement data using the physics model, providing the derived measurement data and at least a portion of the direct measurement data to a machine learning model and generating a coordinate position corresponding to a fault condition of the power cells, comparing the coordinate position to a fault map and identifying a probable fault cause based on the comparison, and altering an operation of the vehicle based on the comparison.

In addition to one or more of the features described herein, the at least one vehicle subsystem is an electric motor configured to provide motive power to the vehicle, and wherein the electric power storage system is a multi-cell battery.

In addition to one or more of the features described herein, the operation of the vehicle that is altered includes a notification to a vehicle operator.

In addition to one or more of the features described herein, providing the set of direct measurements to a physics model further includes detecting a trenchant current condition of the electric power storage system and providing the set of direct measurements to a first physics model while the electric power storage system is in a non-trenchant current condition and providing the set of direct measurements to a second physics model while the electric power storage system is in a trenchant current condition.

In addition to one or more of the features described herein, the first physics model for each cell is $$\frac{R_{sc}}{R_{sc}+R}V_{oc}+\frac{R_{sc}}{R_{sc}+R}RI_L=aV_{oc}+bI_L,$$

with R being an internal resistance of the cell, $R_{sc}$ being an internal short circuit resistance of the power cell, R being a resistance of the power cell, $V_{oc}$ being an open circuit voltage of the power cell, and $I_l$ being an external load charge current of the power cell, and wherein the second physics model for each cell is a residual voltage for cell $dV_i=aiV_{ocm}+biI_L$, with constants a and be being estimated using one of a recursive least square regression model and a Kalman filtering model, and $$ai=-\left[1-\frac{R_{sc}}{R_{sc}+R}\frac{V_{oc}}{V_{ocm}}\right],\ bi=\frac{R_{sc}}{R_{sc}+R}R-R_m,$$

for i=1, 2, . . . n cells, with $R_{sc}$ being an internal short circuit resistance of the power cell, R being an internal resistance of the cell, $V_{ocm}$ being a mean voltage and $R_m$ being a mean resistance according to $V_{tm}=V_{ocm}+R_m\ I_L$, and $I_l$ being an external load charge current of the power cell.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
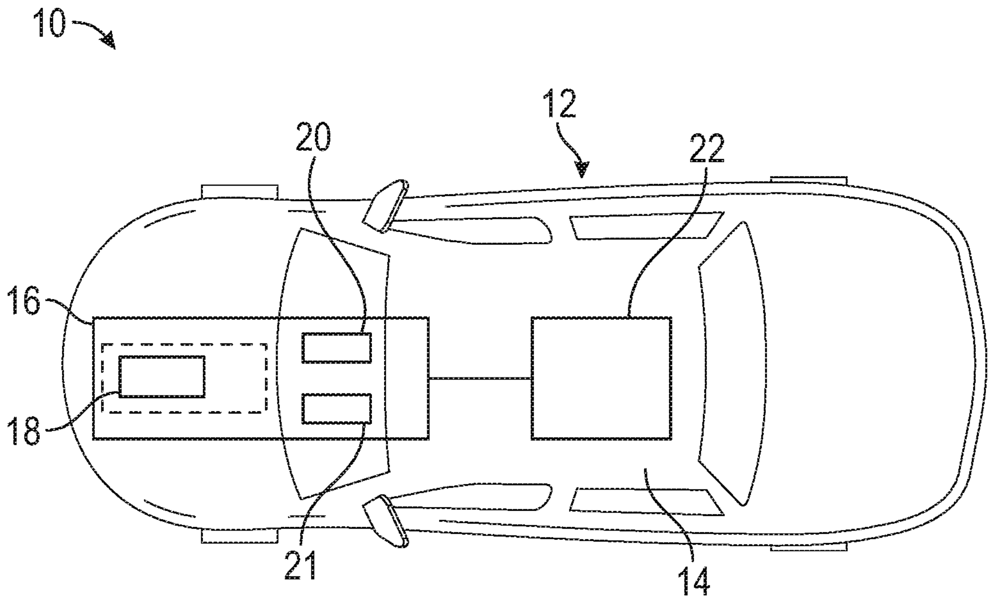
FIG. 1 is a top view of a motor vehicle including a battery assembly or system, in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, methods, devices and systems are provided for the monitoring of a battery system, such as an electric vehicle or hybrid vehicle battery system. The embodiments may be applicable to various cell-based energy storage systems, including those for electric vehicles, hybrid electric vehicles, and any similar systems.

An embodiment of the method and system described herein provides an artificial intelligence (AI) and machine learning approach to detecting and isolating faults within a vehicle electrical energy storage cell. In one embodiment, relevant cell parameters (e.g., electrochemical parameters) are measured using a suite of sensors and a set of direct measurement data is generated. The direct measurement data is provided to a physics model, which generates a set of derived measurement data based on the set of direct measurement data and generates a pair of estimated parameters. The direct measurement data, the derived measurement data sets, and the pair of parameters are provided to a machine learning classifier. The machine learning classifier utilizes the data sets to identify a corresponding cluster chart and identifies a probable cause of an identified fault occurring within the energy storage system based on the position of the pair of estimated parameters within the chart. Once the cause of the fault has been identified an appropriate remedial action corresponding to the cause of the fault is identified by a controller, and the appropriate remedial action is either performed (in the case of an action that can be automatically performed) or communicated to the vehicle operator in the case of an action that must be performed manually.

The embodiments described herein are not limited to use with any specific vehicle, or type of vehicle, and may be applicable to various contexts. For example, embodiments may be used with passenger vehicles, commercial vehicles, trucks, aircraft, construction equipment, farm equipment, automated factory equipment and/or any other device or system for which electric energy storage cell fault identification and isolation may prove beneficial.

FIG. 1 shows an embodiment of a motor vehicle 10, which includes a vehicle body 12 defining, at least in part, an occupant compartment 14. The vehicle body 12 also supports various vehicle subsystems including a propulsion system 16, a battery system 22 and other subsystems to support functions of the propulsion system 16 and other vehicle components, such as a braking subsystem, a suspension system, a steering subsystem, a fuel injection subsystem, an exhaust subsystem and others.

The vehicle 10 may be a combustion engine vehicle, an electrically powered vehicle (EV) or a hybrid vehicle. In an embodiment, the vehicle 10 is a hybrid vehicle that includes a combustion engine system 18 and at least one electric motor assembly. For example, the propulsion system 16 includes a first electric motor 20 and a second electric motor 21. The motors 20 and 21 may be configured to drive wheels on opposing sides of the vehicle 10. Any number of motors positioned at various locations may be used.

The vehicle 10 includes a battery system 22, which may be electrically connected to the motors 20 and 21 and/or other components, such as vehicle electronics. The battery system 22 may be configured as a rechargeable energy storage system (RESS).

Figure 2:
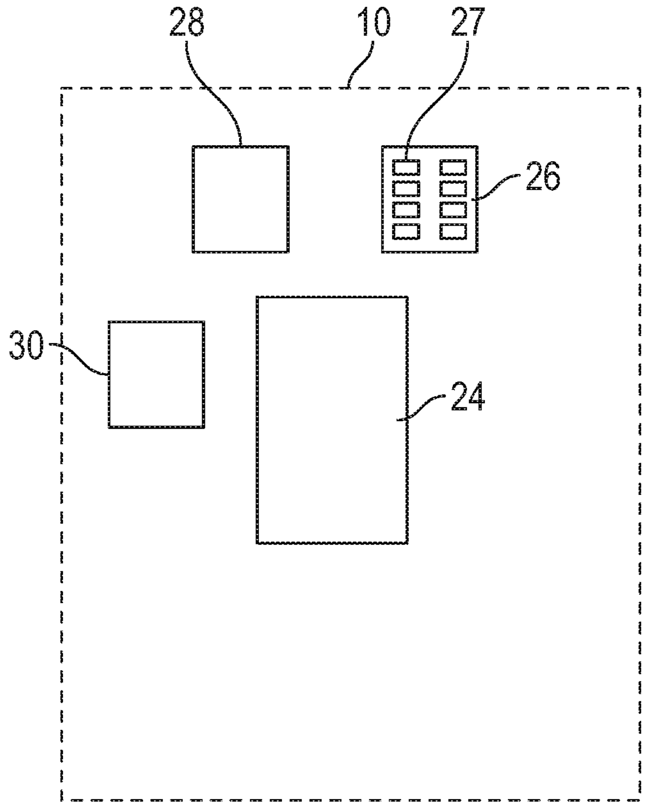
FIG. 2 depicts an exemplary electric power storage system, in accordance with an exemplary embodiment.

A schematic embodiment of the vehicle 10 is illustrated in FIG. 2, the battery system 22 includes a battery assembly such as a high voltage battery pack 24 having a plurality of battery modules 26. Each of the battery modules 26 includes a number of individual cells 27. While eight cells 27 are illustrated for the sake of explanation it is appreciated that a practical battery system 22 may include a substantially larger number of cells 27. The battery system 22 may also include a monitoring unit 28 (e.g., RESS controller) configured to receive measurements from sensors 30. Each sensor 30 may be an assembly or system having one or more sensors for measuring various battery and environmental parameters, such as temperature, current and voltages. The monitoring unit 28 includes components such as a processor, memory, an interface, a bus and/or other suitable components.

During operation of the vehicle 10, and due to conventional wear and tear, one or more of the cells 27 within the battery system 22 (alternately referred to as an electric power storage system) can become degraded. The degradation can take one or more different forms and can result in multiple types of fault. Some sensor 30 systems are capable of detecting that a fault is present without distinguishing the particular type of fault and/or without identifying the specific cell(s) 27 in which the fault has occurred.

Figure 3:
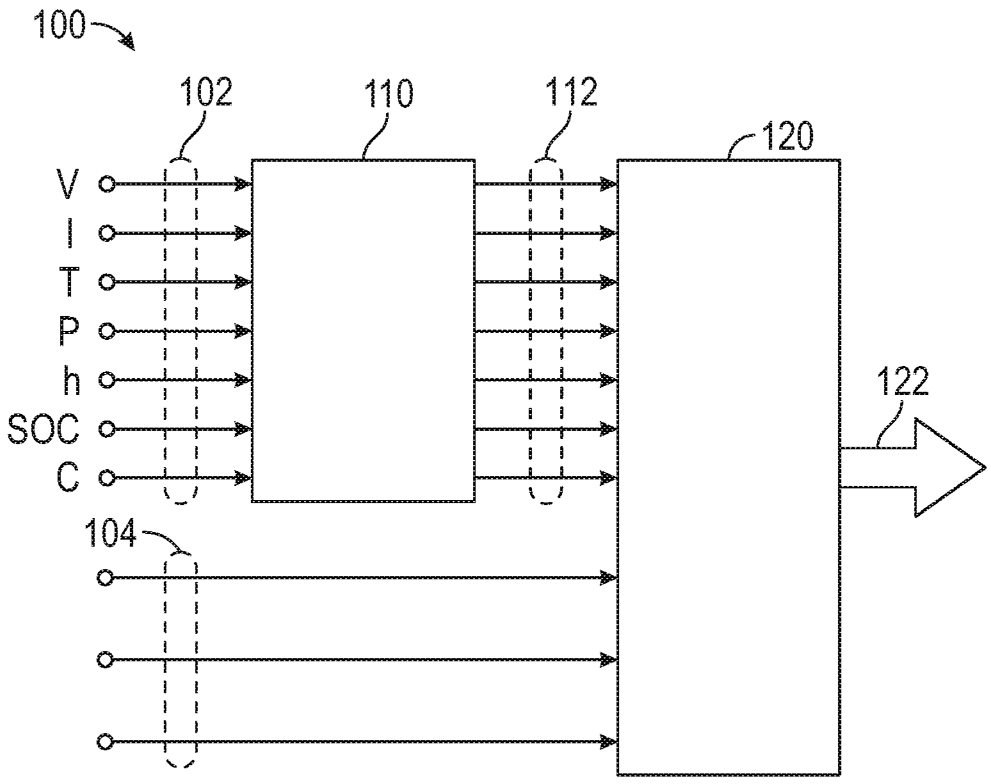
FIG. 3 depicts a control system for classifying a fault cause of a power cell, in accordance with an exemplary embodiment.

FIG. 3 illustrates an exemplary control system 100 including a first physics model 110 and a second machine learning model 120. The control system 100 can be included within the monitoring unit 28, FIG. 2, within a vehicle controller connected to the battery system 22, or distributed across the monitoring unit 28, a vehicle controller 22, and any other controllers including processing capabilities within the vehicle 10.

The control system 100 receives measurements from the sensors 30 along sensor lines 102, 104. A first set of sensor lines 102 provide directly measured cell data such as a cell voltage V, a cell current I, a cell temperature T, a cell press P, a cell vent gas metric H, a cell state of charge SOC, and a cell capacitance CAP to the physics model 110. The physics model 110 uses an established mathematical physics-based equation to generate a set of derived cell data 112. By way of example, the physics model 110 can use either a recursive least square regression model or Kalman filtering to identify two parameters (a, b) and derived cell data. The derived cell data 112 can include, in some examples, a short resistance of the cell, a short circuit current of the cell, a real impedance, an imaginary impedance, a solid electrolyte interphase (SEI) layer thickness, and an open circuit voltage degradation coefficient. The two parameters (a, b) are arbitrary scalar parameters that combine the measured data.

Figure 4:
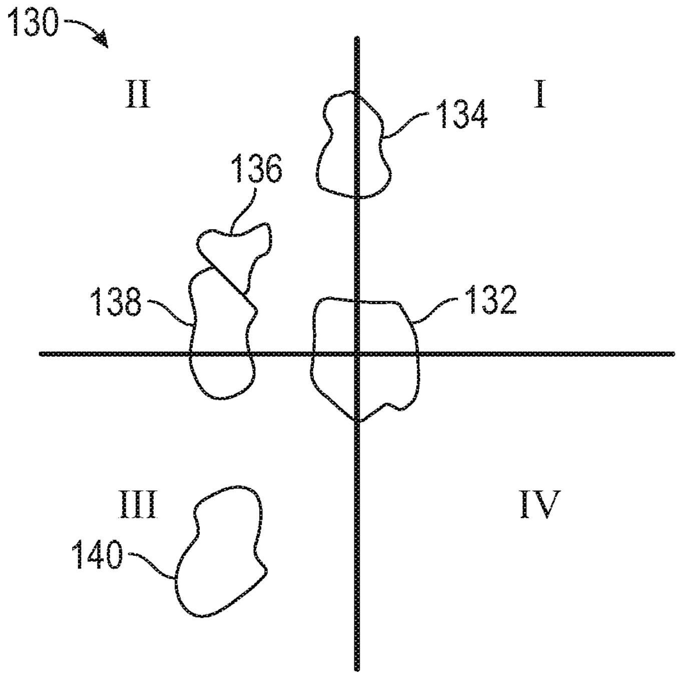
FIG. 4. depicts a two-axis plot for classifying fault causes using a machine learning classifier.

The derived data set 112, a second portion of the directly measured data 104, and the identified parameters (a, b) are provided to the machine learning module 120. The machine learning module 120 applies a trained classifier to the received data and detects and isolates different cell failure modes by defining each cell using the two parameters (a, b)

and the received data corresponding the cell, with the two parameters (a, b) defining a coordinate on a two-axis plot 130 (FIG. 4).

The two-axis plot 130 is characterized by multiple clusters 132, 134, 136, 138, and 140. The position of each cluster 132, 134, 136, 138, 140 on the two-axis plot corresponds to the measured and derived data and is trained via the machine learning process. Each of the clusters 132, 134, 136, 138, 140 corresponds to a certain health condition of the corresponding cell 27. In the example of FIG. 4, the centrally located cluster 132 corresponds to a healthy or normal cell 27, the upper cluster 134 corresponds to a cell 27 where a fault is arising from an increased internal resistance, the cluster 136 entirely within quadrant II corresponds to a cell 27 where a fault is arising from a degradation of the lithium plating, the cluster 138 straddling quadrants II and III, corresponds to a cell 27 where the fault is arising due to a fading cell capacitance, and the cluster 140 entirely within quadrant III corresponds to a failure arising due to an internal short circuit of the cell 27. The position and shape of each cluster 132, 134, 136, 138, 140 is exemplary in nature, and a practical application of this system may include different shapes and placements of the clusters 132, 134, 136, 138, 140. Further practical implementations may also include additional clusters corresponding to additional faults, or combinations of faults, depending on the information available to the system via the sensors 30.

By identifying which cluster 132, 134, 136, 138, 140 the two-parameters (a, b) output to the machine learning classifier 120 are closest to, the classifier 120 is able to identify a cause of a fault condition, output the cause of the fault condition on an output 122, and generate an appropriate corresponding response within the vehicle. By way of example, when the fault is an increase in the internal resistance of the cell, the controller 28 receives the output of the classifier 120 and may prompt the operator to schedule maintenance within a predefined time period. Alternately, when the fault is an internal short within a cell, the vehicle may prompt the operator to cease vehicle operation as soon as is safely possible until appropriate remediation has occurred.

In some examples, the control system 100 can select between multiple different physics models 110 depending on the operational characteristics of the electric power storage system 26. By way of example, the control system 100 may utilize a first physics model (see FIGS. 5 and 6) under most conditions, and a second physics model (see FIGS. 5 and 7) when the electric energy storage system 26 is operating under trenchant current.

Figure 5:
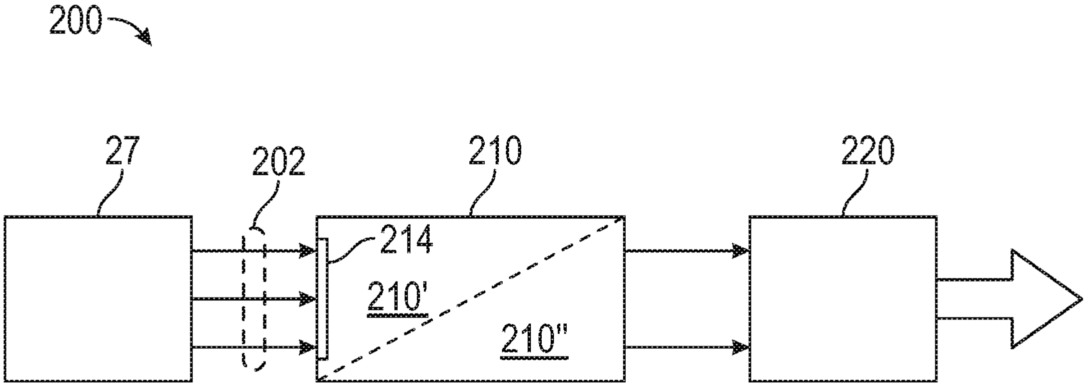
FIG. 5 depicts an example control system according to one particular embodiment.
Figure 8:
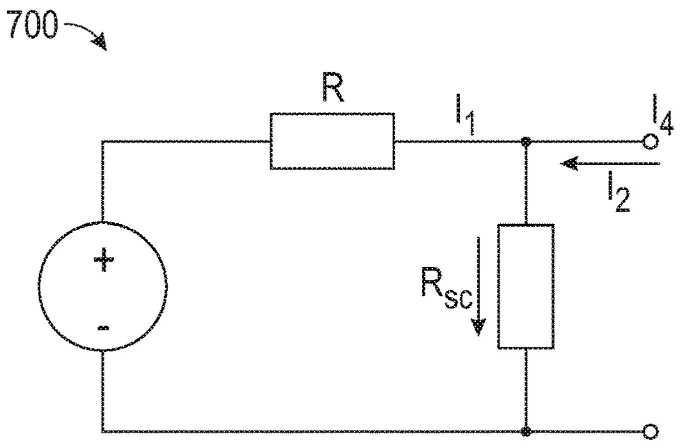
FIG. 8 depicts an exemplary circuit diagram of a power cell for any of the previously described FIGS., in accordance with an exemplary embodiment.
Figure 9:
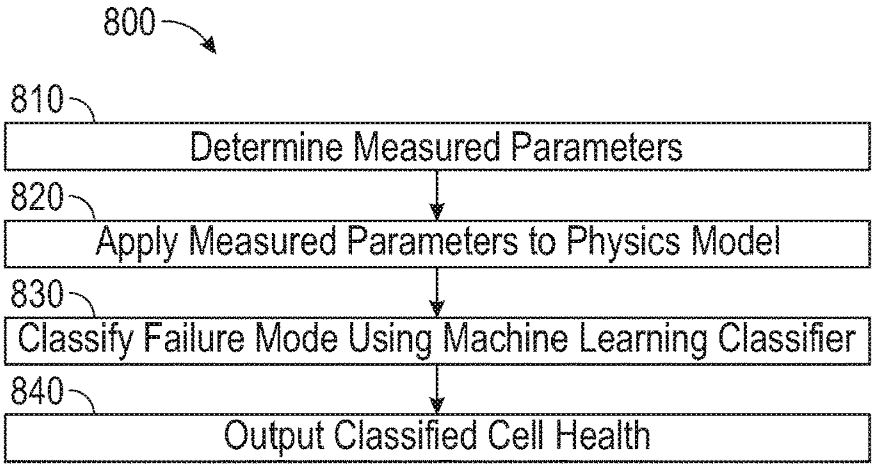
FIG. 9 depicts an exemplary method for operating the systems illustrated and described herein.

In the example of FIG. 5, each battery cell 27 is sensed by one or more sensors 30 resulting in a set of direct measurement data 202. The set of direct measurement data 202 is provided the physics model 210, through a module 214 that identifies the operational mode of the cell 27 (e.g., normal operations, or trenchant current operations). In the example of FIG. 5, the set of direct measurement data 202 includes R (an internal resistance of the cell 27), $R_{sc}$ (an internal short circuit resistance of the power cell 27), $V_{oc}$ (an open circuit voltage of the power cell 27), and Il (an external load charge current of the power cell 27.) With continued reference to FIG. 5, FIG. 8 illustrates an example circuit diagram of one cell 27.

When the cell 27 is not operating under a trenchant current, the physics model 210' operates using the following:

$$V_t = \frac{R_{sc}}{R_{sc}+R}V_{oc} + \frac{R_{sc}}{R_{sc}+R}RI_L = aV_{oc} + bI_L. \qquad 1)$$

Where $V_t$ is an instantaneous voltage, $R_{sc}$ is a short circuit resistance, R is an internal resistance of the cell, $I_l$ is an external load charge current of the cell, $V_{oc}$ is an open circuit voltage of the power cell, and a and b are scalar values that are solved for by the physics model.

In one example, the internal short resistance $R_{sc}$ is on the order of 100-1000 ohms, when a short resistance >1 ohm $$\frac{R_{sc}}{R_{sc}+R} = 0.998,$$

so equation 1 (above) can be approximated by $V_t=V_{oc}+RI_L=a+bI_L$, as a simplified version to estimate a and b.

In contrast to this, when the cell 27 is operating under a trenchant current, the module 214 causes the physics model 210 to apply a specialized formula, defined below in Equation 2, $$dV_i = a_iV_{ocm} + b_iI_L. \qquad 2)$$

$$ai = -\left[1 - \frac{R_{sc}}{R_{sc}+R}\frac{V_{oc}}{V_{ocm}}\right],\ bi = \frac{R_{sc}}{R_{sc}+R}R - R_m,\ i = 1, 2, \ldots\ n \text{ cells}$$

with $R_{sc}$ being an internal short circuit resistance of the power cell, R being an internal resistance of the cell, $V_{oc}$ being an open circuit voltage of the cell, $V_{ocm}$ being a mean voltage all the cells and $R_m$ being a mean resistance of all the cells according to $V_{tm}=V_{ocm}+R_m\,I_L$, and $I_l$ being an external load charge current of the power cell 27, and a and b being scalar values solved for by the physics model.

In addition to affecting the specific physics model 210', 210'' that is utilized, the corresponding two-axis plot 230, 330 (with FIG. 6 corresponding to 210', and FIG. 7 corresponding to 210'') is selected based on the mode in which the cell is operating (e.g., trenchant current or non-trenchant current) and the measured and derived data.

Figure 6:
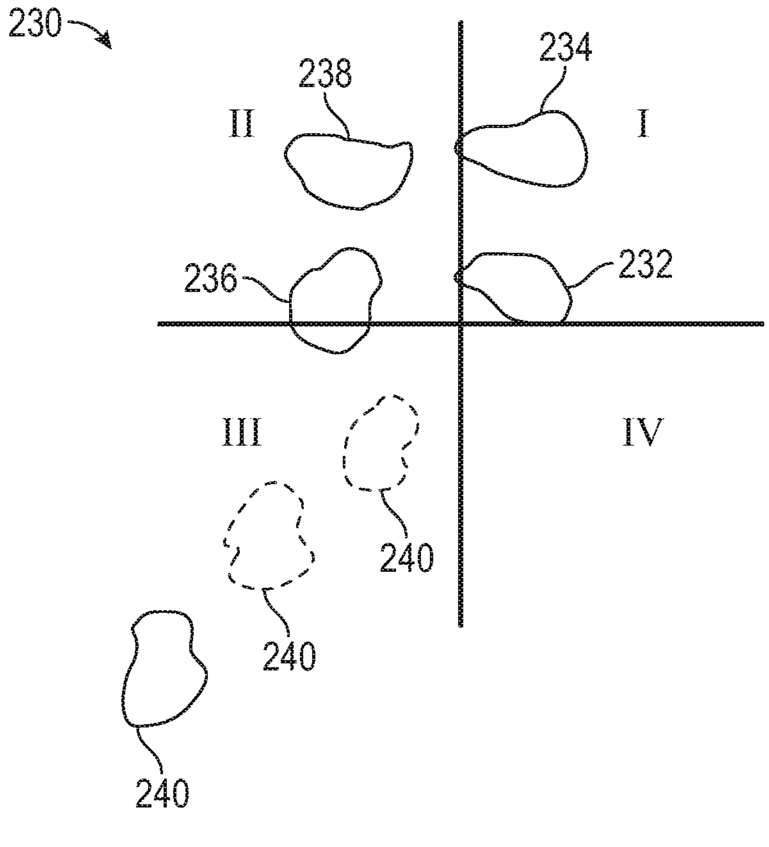
FIG. 6 depicts a first two axis plot for classifying fault causes using the control system of FIG. 5.

The two-axis plot 230 illustrated in FIG. 6 corresponds to a non-trenchant current state, with a healthy operations cluster 232, an increasing internal resistance based fault cluster 234, a fading capacity cluster 236, a cluster 238 indicating a combination of increasing internal resistance and a fading capacity, and a set of clusters 240 indicating an internal cell short circuit, with the severity of the internal cell short circuit corresponding to the distance that the cluster 240 is from the center of the plot 230. Similarly, the two-axis plot 330 of FIG. 7 corresponds to the trenchant mode of operation of the cell and includes a normal operations cluster 232, an internal resistance increasing cluster 234, a cell capacitance fading cluster 236, and an internal short cluster 240.

Figure 7:
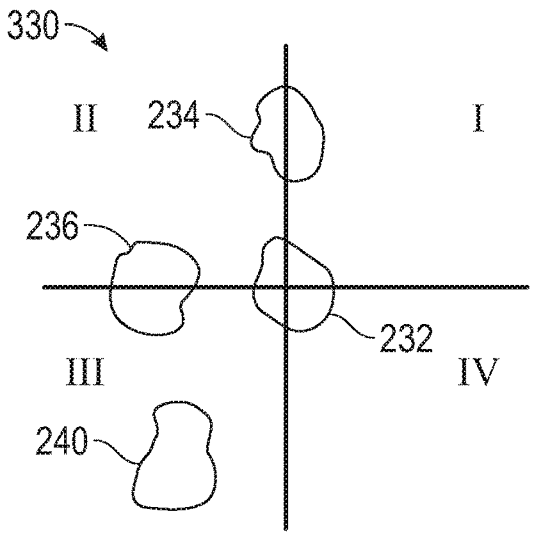
FIG. 7 depicts a second two axis plot for classifying fault causes using the control system of FIG. 5.

In yet other embodiments, the two-axis plots of FIGS. 4, 6 and 7 or similar plots can include additional clusters corresponding to additional potential failure modes for a given cell. By way of example, clusters can be identified using the machine learning module 220 for abnormal SEI layer growth, Li-plating, dendrite, loss of active material, separator damage, aged electrolyte, capacity loss, and similar potential failure modes.

With continued reference to FIGS. 1-8, FIG. 9 depicts a flowchart describing an operation 800 of the method and system of FIGS. 1-8. Initially, sensors 30 detect parameters of each cell 27 and provide the parameters to the controller in step 810 "Determine Measured Parameters". The measured parameters are provided to the physics model 110, 210 and the physics model 110, 210 determines the estimated two parameters (a, b) and any derived cell data in step 820 "Apply Measured Parameters to Physics Model". This step generates an output of at least a pair of parameters (a, b) and the set of derived data, and the outputs are provided to the machine learning classifier module 120, 220. The classifier module 120, 220 classifies the type of failure mode by applying the parameters (a, b) to a corresponding two-axis plot in step 830 "Classify Failure Mode Using Machine Learning Classifier". Once classified, the identified failure mode is output from the control system 100 and provided to at least one response module in step 840 "Output Classified Cell Health".

The response module can be any control system within the vehicle and provides an alteration to the operation of the vehicle based on the classification. By way of example, if the classification identifies the cell 27 as including an increasing internal resistance, the response module alters the operation of the vehicle to alert the operator to schedule maintenance within a predefined time period. In another example, when the classifier determines that the cell includes an internal short circuit, the response module Alerts the vehicle operator and instructs the vehicle operator to cease operations as soon as possible. In yet a further example, where the identified internal short circuit exceeds a predefined metric, the response module can actively intervene in the operation of the individual cell, or the electric storage system entirely, in order to prevent an occurrence of thermal runaway.

It is appreciated that alternative health identifications for any given cell within the energy storage system can be responded to with any other appropriate remedial response including automatically scheduling maintenance, providing specific operator instructions, altering the electrical characteristics of the energy storage device, or any other remedial action as may be appropriate. The specific remedial actions can be stored in one or more vehicle controllers.

Furthermore, while described above with regards to an energy storage system for a vehicle, it is appreciated that the systems and methods described herein can apply to any number of other components or systems and are not limited to analysis of an electrical energy storage system within a vehicle.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A system for monitoring an electric power storage system of a vehicle, comprising:

a processor electrically connected to a plurality of sensors, each of the sensors being configured to detect at least one parameter of the electric power storage system the processor being configured to perform, in response to an identified fault condition with a set of power cells and in real time during operation of the vehicle, acquiring a set of direct measurement data of the set of power cells from the plurality of sensors, providing the set of direct measurement data to a physics model within the processor and generating a set of derived measurement data using the physics model, wherein providing the set of direct measurements to the physics model includes detecting a trenchant current condition of the electric power storage system and providing the set of direct measurements to a first physics model while the electric power storage system is in a non-trenchant current condition and providing the set of direct measurements to a second physics model while the electric power storage system is in a trenchant current condition, and wherein the physics model for each cell includes a first physics model including $$\frac{R_{sc}}{R_{sc}+R}V_{oc}+\frac{R_{sc}}{R_{sc}+R}RI_L=aV_{oc}+bI_L,$$

with R being an internal resistance of the cell, $R_{sc}$ being an internal short circuit resistance of the power cell, R being a resistance of the power cell, $V_{oc}$ being an open circuit voltage of the power cell, and $I_l$ being an external load charge current of the power cell;

providing the derived measurement data and at least a portion of the direct measurement data to a machine learning model and generating a coordinate position corresponding to a fault condition of the set of power cells;

comparing the coordinate position to a fault map and identifying a probable fault cause based on the comparison; and altering an operation of the vehicle based on the comparison.

2. The system of claim 1, wherein the physics model includes applying one of a recursive least square model, a regression model, and a Kalman filter based model to the set of direct measurement data, and thereby determining an estimated pair of parameters ($a_i$ and $b_i$) for each cell of the electric power storage system.

3. The system of claim 1, wherein the physics model includes a residual voltage for cell $dV_i = aiV_{ocm} + biI_L$, with constants a and b being estimated using one of a recursive least square regression model and a Kalman filtering model, and $$ai = -\left[1 - \frac{R_{sc}}{R_{sc}+R}\frac{V_{oc}}{V_{ocm}}\right],\ bi = \frac{R_{sc}}{R_{sc}+R}R - R_m,$$

for i=1, 2, . . . n cells, with $R_{sc}$ being an internal short circuit resistance of the power cell, R being an internal resistance of the cell, $V_{ocm}$ being a mean voltage and Rm being a mean resistance according to $V_{tm} = V_{ocm} + R_m\ I_L$, and $I_l$ being an external load charge current of the power cell.

4. The system of claim 1, wherein altering an operation of the vehicle comprises prompting a vehicle operator to cease operation of the vehicle within a predetermined time period in response to the identified probable fault being an internal short circuit of a power cell.

5. The system of claim 1, wherein the identified probable fault is one of a rising internal resistance, a decreasing internal capacity of the power cell, and an internal short circuit within the cell.

6. The system of claim 1, wherein altering an operation of the vehicle comprises alerting an operator to schedule maintenance within a predefined time period responsive to the identified probable fault an increasing internal resistance.

7. The system of claim 1, wherein the fault map includes a plurality of two-axis plots, each the two-axis plot corresponding to a distinct mode in which the cells are operating.

8. A method for identifying a fault within an electric power storage system of a vehicle comprising:

detecting a plurality of parameters of an electric power storage system for a vehicle and responding to an identified fault condition with a set of power cells of the electric power storage system of the vehicle by:

acquiring a set of direct measurement data of the set of power cells from detected plurality of parameters, providing the set of direct measurement data to a physics model within a processor and generating a set of derived measurement data using the physics model, wherein, providing the set of direct measurements to the physics model includes detecting a trenchant current condition of the electric power storage system and providing the set of direct measurements to a first physics model while the electric power storage system is in a non-trenchant current condition and providing the set of direct measurements to the second physics model while the electric power storage system is in a trenchant current condition wherein the second physics model includes residual voltage for cell $dV_i = aiV_{ocm} + biI_L$, with constants a and b being estimated using one of a recursive least square regression model and a Kalman filtering model, and $$ai = -\left[1 - \frac{R_{sc}}{R_{sc}+R}\frac{V_{oc}}{V_{ocm}}\right],\ bi = \frac{R_{sc}}{R_{sc}+R}R - R_m,$$

for i=1, 2 . . . n cells, with $R_{sc}$ being an internal short circuit resistance of the power cell, R being an internal resistance of the cell, $V_{ocm}$ being a mean voltage and Rm being a mean resistance according to $V_{tm} = V_{ocm} + R_m\ I_L$, and $I_l$ being an external load charge current of the power cell;

providing the derived measurement data and at least a portion of the direct measurement data to a machine learning model and generating a coordinate position corresponding to a fault condition of the power cells;

comparing the coordinate position to a fault map and identifying a probable fault cause based on the comparison; and altering an operation of a vehicle based on the comparison.

9. The method of claim 8, wherein the method is performed in real time during operation of the vehicle.

10. The method of claim 8, wherein the physics model includes applying one of a recursive least square model, a regression model, and a Kalman filter based model to the set of direct measurement data, and thereby determining pair of estimated parameters ($a_i$, $b_i$) for each cell of the electric power storage system.

11. The method of claim 8, wherein the first physics model for each cell is $$\frac{R_{sc}}{R_{sc}+R}V_{oc} + \frac{R_{sc}}{R_{sc}+R}RI_L = aV_{oc} + bI_L,$$

with R being an internal resistance of the cell, $R_{sc}$ being an internal short circuit resistance of the power cell, R being a resistance of the power cell, $V_{oc}$ being an open circuit voltage of the power cell, and $I_l$ being an external load charge current of the power cell.

12. The method of claim 8, wherein altering an operation of the vehicle comprises prompting a vehicle operator to cease operation of the vehicle within a predetermined time period in response to the identified fault being an internal short circuit of a power cell.

13. The method of claim 8, wherein the identified fault is one of a rising internal resistance, a decreasing internal capacity of the power cell, and an internal short circuit within the cell.

14. The method of claim 8, wherein altering an operation of the vehicle comprises alerting an operator to schedule maintenance within a predefined time period responsive to the identified probable fault an increasing internal resistance.

15. The method of claim 8, wherein the fault map includes a plurality of two-axis plots, each the two-axis plot corresponding to a distinct mode in which the cells are operating.

16. A vehicle comprising:

an electric power storage system;

at least one vehicle subsystem configured to receive operational power from the electric power storage system;

an electric power storage system monitor configured to monitor a health of the electric power storage system, the electric power storage system monitor including:

a processor electrically connected to a plurality of sensors, each of the sensors being configured to detect at least one parameter of the electric power storage system the processor being configured to perform, in response to an identified fault condition with a set of power cells and in real time during operation of the vehicle, acquiring a set of direct measurement data of the set of power cells from the plurality of sensors, providing the set of direct measurement data to a physics model within the processor and generating a set of derived measurement data using the physics model, wherein the physics model for each cell includes:

a first physics model including $$\frac{R_{sc}}{R_{sc}+R}V_{oc}+\frac{R_{sc}}{R_{sc}+R}RI_L=aV_{oc}+bI_L,$$

with R being an internal resistance of the cell, $R_{sc}$ being an internal short circuit resistance of the power cell, R being a resistance of the power cell, $V_{oc}$ being an open circuit voltage of the power cell, and $I_l$ being an external load charge current of the power cell, and a second physics model including residual voltage for cell $dV_i=aiV_{ocm}+biI_L$, with constants a and b being estimated using one of a recursive least square regression model and a Kalman filtering model, and $$ai=-\left[1-\frac{R_{sc}}{R_{sc}+R}\frac{V_{oc}}{V_{ocm}}\right],\ bi=\frac{R_{sc}}{R_{sc}+R}R-R_m,$$

for i=1, 2 . . . n cells, with $R_{sc}$ being an internal short circuit resistance of the power cell, R being an internal resistance of the cell, $V_{ocm}$ being a mean voltage and Rm being a mean resistance according to $V_{tm}=V_{ocm}+R_m\ I_L$, and $I_l$ being an external load charge current of the power cell;

providing the set of direct measurements to the physics model includes detecting a trenchant current condition of the electric power storage system and providing the set of direct measurements to the first physics model while the electric power storage system is in a non-trenchant current condition and providing the set of direct measurements to the second physics model while the electric power storage system is in a trenchant current condition;

providing the derived measurement data and at least a portion of the direct measurement data to a machine learning model and generating a coordinate position corresponding to a fault condition of the power cells;

comparing the coordinate position to a fault map and identifying a probable fault cause based on the comparison; and altering an operation of the vehicle based on the comparison.

17. The vehicle of claim 16, wherein the at least one vehicle subsystem is an electric motor configured to provide motive power to the vehicle, and wherein the electric power storage system is a multi-cell battery.

18. The vehicle of claim 17, wherein the operation of the vehicle that is altered includes a notification to a vehicle operator.

19. The vehicle of claim 16, wherein altering an operation of the vehicle comprises alerting an operator to schedule maintenance within a predefined time period responsive to the identified probable fault an increasing internal resistance.

20. The vehicle of claim 16, wherein the fault map includes a plurality of two-axis plots, each the two-axis plot corresponding to a distinct mode in which the cells are operating.

* * * * *